US007297749B2

(12) United States Patent
Schang et al.

(10) Patent No.: US 7,297,749 B2
(45) Date of Patent: Nov. 20, 2007

(54) ASYMMETRIC POLYISOCYANATE MONOMERS IN URETHANE POLYMERS AND OLIGOMERS TO REDUCE CRYSTALLINITY

(75) Inventors: Craig S. Schang, Brighton, MI (US); Walter H. Ohrbom, Hartland Township, MI (US); Joanne Casale, Warren, MI (US); Thaddeus J. Lepkowski, Dearborn Heights, MI (US)

(73) Assignee: BASF Corporation, Southfield, MI (US)

(*) Notice: Subject to any disclaimer, the term of this patent is extended or adjusted under 35 U.S.C. 154(b) by 266 days.

(21) Appl. No.: 10/965,346

(22) Filed: Oct. 14, 2004

(65) Prior Publication Data

US 2005/0101746 A1 May 12, 2005

Related U.S. Application Data

(62) Division of application No. 10/317,695, filed on Dec. 12, 2002, now Pat. No. 6,844,395.

(60) Provisional application No. 60/341,470, filed on Dec. 17, 2001.

(51) Int. Cl.
  *C08G 18/70* (2006.01)

(52) U.S. Cl. ............... 525/452; 525/453; 525/454; 525/457; 528/44; 528/85; 524/590; 427/384

(58) Field of Classification Search .......... 524/590; 528/44, 85; 525/452, 453, 454, 457
See application file for complete search history.

(56) References Cited

U.S. PATENT DOCUMENTS

| 3,959,201 A | 5/1976 | Chang |
| 5,089,617 A | 2/1992 | Forgione et al. ............ 544/196 |
| 5,175,227 A | 12/1992 | Gardon et al. |
| 5,300,328 A | 4/1994 | Rehfuss .................. 427/388.3 |
| 5,336,566 A | 8/1994 | Rehfuss ...................... 428/524 |
| 5,356,669 A | 10/1994 | Rehfuss et al. ............ 427/407.1 |
| 5,373,069 A | 12/1994 | Rehfuss et al. ............. 525/456 |
| 5,451,656 A | 9/1995 | Menovcik et al. ........... 528/288 |
| 5,474,811 A | 12/1995 | Rehfuss et al. ............. 427/407.1 |
| 5,508,379 A | 4/1996 | Menovcik et al. ........... 528/367 |
| 5,512,639 A | 4/1996 | Rehfuss et al. ............. 525/456 |
| 5,532,061 A | 7/1996 | Menovcik et al. .......... 428/423.1 |
| 5,605,965 A | 2/1997 | Rehfuss et al. ............. 525/100 |
| 5,639,828 A | 6/1997 | Briggs et al. ............... 525/208 |
| 5,659,003 A | 8/1997 | Menovcik et al. ............. 528/73 |
| 5,665,433 A | 9/1997 | Moussa et al. |
| 5,693,723 A | 12/1997 | Green ....................... 525/481 |
| 5,693,724 A | 12/1997 | Green ....................... 525/481 |
| 5,723,552 A | 3/1998 | Menovcik et al. ........... 525/453 |
| 5,726,244 A | 3/1998 | McGee et al. ................. 525/78 |
| 5,726,246 A | 3/1998 | Rehfuss et al. ............. 525/100 |
| 5,726,274 A | 3/1998 | Menovcik et al. ............. 528/85 |
| 5,744,550 A | 4/1998 | Menovcik et al. ............ 525/162 |
| 5,756,213 A | 5/1998 | Ohrbom et al. ............. 428/412 |
| 5,760,127 A | 6/1998 | Bammel et al. .............. 524/590 |
| 5,766,769 A | 6/1998 | Ohrbom et al. ........... 428/423.1 |
| 5,770,650 A | 6/1998 | McGee et al. ............... 524/590 |
| 5,777,048 A | 7/1998 | Ohrbom et al. ............. 525/509 |
| 5,792,810 A | 8/1998 | Menovcik et al. ........... 524/590 |
| 5,827,930 A | 10/1998 | Ohrbom et al. ............. 525/440 |
| 5,852,136 A | 12/1998 | Green ........................ 525/456 |
| 5,854,385 A | 12/1998 | McGee et al. ............... 528/369 |
| 5,866,259 A | 2/1999 | Harris et al. ................ 428/24.4 |
| 5,872,195 A | 2/1999 | Green et al. ................. 525/481 |
| 5,888,655 A | 3/1999 | Harris et al. ............... 428/423.1 |
| 5,907,024 A | 5/1999 | Ohrbom et al. |
| 5,989,642 A | 11/1999 | Singer et al. ............. 427/407.1 |
| 5,994,479 A | 11/1999 | Green et al. ................. 525/481 |
| 6,040,062 A | 3/2000 | McGee et al. ............... 428/500 |
| 6,080,825 A | 6/2000 | Ohrbom et al. ............. 525/481 |
| 6,084,038 A | 7/2000 | Ohrbom et al. ............. 525/481 |
| 6,114,444 A | 9/2000 | Rehfuss et al. ............. 525/101 |
| 6,160,058 A | 12/2000 | Ohrbom et al. ............. 525/481 |
| 6,165,618 A | 12/2000 | Ohrbom et al. ........... 428/423.1 |
| 6,245,855 B1 | 6/2001 | Swarup et al. ............... 525/157 |
| 6,303,690 B1 | 10/2001 | December et al. |
| 6,423,788 B1 * | 7/2002 | Bammel et al. ............. 525/410 |
| 6,541,594 B2 * | 4/2003 | Ohrbom et al. ............... 528/45 |
| 2003/0091833 A1 | 5/2003 | Baumgart et al. |
| 2003/0114628 A1 | 6/2003 | Ohrbom et al. |

FOREIGN PATENT DOCUMENTS

| CA | 2108 990 | 10/1993 |
| CA | 2187 222 | 10/1996 |
| EP | 0 780 455 | 12/1996 |
| EP | 832 950 | 9/1997 |
| EP | 0 869 139 | 3/1998 |
| WO | WO 87/00851 | 2/1987 |
| WO | WO 00/36028 | 6/2000 |
| WO | WO 0036028 A1 * | 6/2000 |
| WO | WO 02/102872 | 12/2002 |

OTHER PUBLICATIONS

BASF Corp., et al., U.S. Appl. No. 08/339,999, filed Nov. 15, 1994, pp. 1-15 and Abstract.

(Continued)

*Primary Examiner*—Randy Gulakowski
*Assistant Examiner*—John J. Figueroa

(57) ABSTRACT

Compositions comprising a reaction product of a) an asymmetrical, saturated polyisocyanate that is non-cyclic, non-aromatic, and has at least 3 carbon atoms in the polyisocyanate per isocyanate group, b) a material that is at least one of i) a primary carbamate material having at least one functional group reactive with an isocyanate and at least one primary carbamate group or a group convertible to a primary carbamate group and ii) a reaction product of the primary carbamate material and an extending agent, and c) optionally, a chain extension agent that has at least difunctional reactivity with an isocyanate. Also, methods of making these compositions.

28 Claims, No Drawings

OTHER PUBLICATIONS

BASF Corp., et al., U.S. Appl. No. 09/211,579, filed Dec. 14, 1998, pp. 1-19.
BASF Corp., et al., U.S. Appl. No. 09/211,578, filed Dec. 14, 1998, pp. 1-19 and abstract.
BASF Corp., et al., U.S. Appl. No. 09/211,577, filed Dec. 14, 1998, pp. 1-18 and abstract.
BASF Corp., et al., U.S. Appl. No. 09/211,598, filed Dec. 14, 1998, pp. 1-19 and abstract.

* cited by examiner

US 7,297,749 B2

ASYMMETRIC POLYISOCYANATE MONOMERS IN URETHANE POLYMERS AND OLIGOMERS TO REDUCE CRYSTALLINITY

CROSS-REFERENCE TO RELATED APPLICATIONS

This application is a divisional application of Ser. No. 10/317,695, filed 12 Dec. 2002 now U.S. Pat. No. 6,844,395, which is a non-provisional application of U.S. Ser. No. 60/341,470 filed on 17 Dec. 2001, all of which are incorporated herein by reference.

FIELD OF THE INVENTION

The present invention relates to urethane polymers and oligomers.

BACKGROUND OF THE INVENTION

Curable, or thermosettable, coating compositions are widely used in the coatings art, particularly for topcoats in the automotive and industrial coatings industry. Color-plus-clear composite coatings are particularly useful as topcoats for which exceptional gloss, depth of color, distinctness of image, or special metallic effects are desired. The automotive industry has made extensive use of these coatings for automotive body panels.

Single-layer topcoats and the clearcoats of color-plus-clear composite coatings, however, require an extremely high degree of clarity and gloss to achieve the desired visual effect. Such coatings also require a low degree of visual aberrations at the surface of the coating in order to achieve the desired visual effect such as high distinctness of image (DOI). As such, these coatings are especially susceptible to a phenomenon known as environmental etch. Environmental etch manifests itself as spots or marks on or in the finish of the coating that often cannot be rubbed out. It is often difficult to predict the degree of resistance to environmental etch that a high gloss topcoat or color-plus-clear composite coating will exhibit. Many coating compositions known for their durability and/or weatherability when used in exterior paints, such as known high-solids enamels, do not provide the desired level of resistance to environmental etch when used in high gloss coatings such as the clearcoat of a color-plus-clear composite coating. Curable coating compositions based on curable components having carbamate or urea functionality have been proposed have been described in the art to provide etch-resistant coatings, e.g., U.S. Pat. Nos. 5,356,669; 5,373,069; 5,854,385; and 6,245,855.

Various compositions have been proposed to meet the above requirements for use as the topcoat coating or as the clearcoat of a color-plus-clear composite coating, including polyurethanes, acid-epoxy systems and the like. However, many prior art systems suffer from disadvantages such as coatability problems, marginal compatibility with the pigmented basecoat, solubility problems, and marginal appearance. Moreover, while one-pack compositions are preferred to two-pack compositions (in which the reactive component must be separated before application to prevent premature reaction), very few one-pack coating compositions have been found that provide satisfactory resistance to environmental etch, especially in the demanding environment of automotive coatings.

In addition, it is desirable to provide coatings with a good combination of properties such as durability, hardness, flexibility, and resistance to scratching, marring, solvents, and acids. It is also desirable to reduce the amount of solvent required in coating compositions in order to reduce the volatile organic content (VOC), which is better for the environment. In addition to etch resistance, scratch and mar resistance is a desired property for a coating. Scratch and marring resistance is the ability of a coating to resist damage caused by abrasion of the coating.

Curable coating compositions utilizing carbamate-functional resins are described, for example, in U.S. Pat. Nos. 6,245,855; 6,160,058; 6,165,618; 6,144,444; 6,084,038; 6,080,825; 6,040,062; 5,994,479; 5,888,655; 5,872,195; 5,866,259; 5,854,385; 5,852,136; 5,827,930; 5,792,810; 5,777,048; 5,770,650; 5,766,769; 5,760,127; 5,756,213; 5,744,550; 5,726,274; 5,726,246; 5,726,244; 5,723,552; 5,693,724; 5,693,723; 5,659,003; 5,639,828; 5,532,061; 5,512,639; 5,508,379; 5,474,811; 5,451,656; 5,373,069; 5,356,669; 5,336,566; and 5,300,328 each of which is incorporated herein by reference, and U.S. application Ser. Nos. 08/719,670, filed Sep. 25, 1996 (EP832950), Ser. No. 08/166,277, filed Dec. 13, 1993, Ser. No. 08/339,999, filed Nov. 15, 1994, Ser. No. 09/211,598, filed Dec. 14, 1998 (WO0036028), Ser. No. 07/965,509, filed Oct. 23, 1992 (CA2108990), and Ser. Nos. 08/540,276 and 08/698,525 both filed Oct. 6, 1995 (CA2187222) each of which is incorporated herein by reference. These coating compositions can provide significant etch advantages over other coating compositions, such as hydroxy-functional acrylic/melamine coating compositions. It may often be desirable, however, to provide still further improvements in the above-described coating properties.

When a symmetrical isocyanate is included in a urethane reaction product, the resulting urethane tends to be crystalline.

SUMMARY OF THE INVENTION

The present invention relates to a composition comprising a reaction product of a) an asymmetrical, saturated polyisocyanate that is non-cyclic, non-aromatic, and has at least 3 carbon atoms in the polyisocyanate per isocyanate group, b) a material that is at least one of i) a primary carbamate material having at least one functional group reactive with an isocyanate and at least one primary carbamate group or a group convertible to a primary carbamate group and ii) a reaction product of the primary carbamate material and an extending agent, and c) optionally, a chain extension agent that has at least difunctional reactivity with an isocyanate.

Also, a the present invention relates to a method comprising reacting a) an asymmetrical, saturated polyisocyanate that is non-cyclic, non-aromatic, and has at least 3 carbon atoms in the polyisocyanate per isocyanate group, a material that is at least one of i) a primary carbamate material having at least one functional group reactive with an isocyanate and at least one primary carbamate group or a group convertible to a primary carbamate group and ii) a reaction product of the primary carbamate material and an extending agent, and c) optionally, a chain extension agent that has at least difunctional reactivity with an isocyanate.

DETAILED DESCRIPTION

As used throughout, ranges are used as a shorthand for describing each and every value that is within the range. Any value within the range can be selected as the terminus of the range.

In one embodiment, the present invention is a composition comprising a reaction product of a) an asymmetrical, saturated polyisocyanate that is non-cyclic, non-aromatic, and has at least 3 carbon atoms in the polyisocyanate per isocyanate group, and b) a material that is at least one of a primary carbamate material having at least one functional group reactive with an isocyanate and at least one primary carbamate group or a group convertible to a primary carbamate group and ii) a reaction product of the primary carbamate material and an extending agent. As used herein, the term reaction material refers to the materials that react to form the reaction product.

The present invention provides compositions that include an asymmetrical, saturated polyisocyanate that is non-cyclic, non-aromatic, and has at least 3 carbon atoms in the polyisocyanate per isocyanate group in their molecules. By poly it is meant that there are at least two isocyanate groups in the molecule. Preferably, the asymmetrical, saturated polyisocyanate is a diisocyanate. By non-cyclic and non-aromatic it is meant that no portion of the polyisocyanate is cyclic or aromatic. Preferably, the asymmetrical, saturated polyisocyanate is a non-crystalline aliphatic. Because of its commercial availability, a preferred asymmetrical, saturated polyisocyanate is trimethylhexamethylene diisocyanate. Trimethylhexamethylene diisocyanate (TMDI) generally has at least the following two isomers in commercially available product: 1,6-diisocyanto-2,2,4-trimethyl hexane and 1,6-diisocyanto-2,4,4-trimethyl hexane. As used throughout this specification, reference to trimethylhexamethylene diisocyanate is to the commercial blend of isomers. Another preferred polyisocyanate is 1,8-diisocyanto-4(isocyantomethyl) octane. The polyisocyanate can also be provided as a dimer, trimer, homopolymer, or as a polyurethane prepolymer of the polyisocyanate.

By asymmetrical it is meant that the polyisocyanate does not have symmetry in its structure. Symmetry is defined in the following applications, U.S. Ser. Nos. 09/211,577; 09/211,578; 09/211,579; and 09/211,598 all filed on Dec. 14, 1998, and all are incorporated herein by reference. Briefly, symmetry operations are geometrically defined ways of exchanging equivalent parts of a molecule. However, such operations are symmetry operations if, and only if, the appearance of the molecule is exactly the same relative to the pre- and post-symmetry operation view. Thus, the term "symmetrical" as used herein refers to a molecule having an appearance that appears identical relative to the pre- and post-symmetry operation views. Put another way, "[a]molecule possesses a symmetry element if the application of the operation generated by the element leaves the molecule in an indistinguishable state." *Molecular Symmetry and Group Theory*, Alan Vincent, Wiley & Sons, N.Y., 1977, reprinted 1981, page 21, incorporated herein by reference.

Additionally, when there are less than 3 carbon atoms in the polyisocyanate per isocyanate group, products that contain these polyisocyariates are generally more crystalline. Note, when counting the carbon atoms in a polyisocyanate, the carbon atom that is in the isocyanate group is part of the isocyanate group and is not counted as a carbon in the polyisocyanate.

Without being limited to theory, it is theorized that polyisocyanates that have freedom of motion in their backbones increase the flexibility of products that contain them. Generally, polyisocyanates that contain cyclics, aromatics, or are ethylenically unsaturated, such as alkenes or alkynes, do not provide freedom of movement that is preferred to obtain maximum levels of flexibility.

The primary carbamate material can be any primary carbamate material that has at least one functional group that is reactive with an isocyanate and at least one primary carbamate group or a group that is convertible to a primary carbamate group. The functional group that is reactive with an isocyanate group includes, but is not limited to, a hydroxyl group, an amine group, and a thiol group. A preferred functional group is a hydroxyl group. A preferred primary carbamate material has a primary carbamate group and a hydroxy group, which is separated from the primary carbamate group by at least two carbon atoms. A preferred primary carbamate material of this type is a hydroxyalkyl carbamate. A preferred hydroxyalkyl carbamate is represented by the following structure:

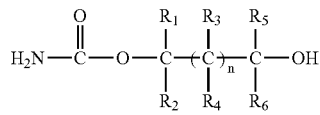

wherein $R_1$, $R_2$, $R_3$, $R_4$, $R_5$, and $R_6$ are each independently H or $C_1$-$C_6$ alkyl, and n is 0 or a positive integer. Preferably, $R_1$, $R_2$, $R_3$, $R_4$, $R_5$, and $R_6$ are each independently H or $C_1$-$C_4$ alkyl. Examples of primary carbamate materials include, but are not limited to, hydroxy ethyl carbamate, hydroxy propyl carbamate, and hydroxy butyl carbamate. A preferred hydroxyalkyl carbamate is hydroxypropyl carbamate, which is at least one of 2-hydroxy propyl-1-carbamate, 1-hydroxy propyl-2-carbamate, and 3-hydroxypropyl carbamate. Hydroxy butyl carbamate includes, but is not limited to, 1-hydroxy butyl-2-carbamate, 2-hydroxy butyl carbamate, and 4-hydroxybutyl carbamate.

The group convertible or capable of converting to a primary carbamate group can form a primary carbamate after the reaction of the primary carbamate material with the asymmetrical, saturated polyisocyanate is completed. These types of primary carbamate materials include, but are not limited to, hydroxy-containing cyclic carbonate compounds, such as glycerine carbonate, which are convertible to primary carbamate by reaction with ammonia (e.g., the reaction product of glycidol and $CO_2$), monoglycidyl ethers (e.g., glycidyl propyl ether convertible to primary carbamate by reaction with $CO_2$ and then ammonia), allyl alcohols where the alcohol group is reactive with NCO and the double bond can be converted to primary carbamate by reaction with peroxide, and vinyl esters where the ester group is reactive with NCO and the vinyl group can be converted to primary carbamate with reaction with peroxide, then $CO_2$, and then ammonia. Also suitable as the primary carbamate material are compounds having a primary carbamate group as well as a group that can be converted into a primary carbamate. The primary carbamate group can then react with the isocyanate group to form an allophanate. The primary carbamate-convertible group can then be converted into a primary carbamate. An example of such a compound is allyl carbamate. In another example, the isocyanate can be reacted with a diol or amino alcohol to form a urethane or urea compound with terminal or pendant hydroxy groups. The terminal or pendant hydroxy groups can then be transformed into primary carbamate groups using known techniques, such as the reaction with phosgene then ammonia, or by transcarbamation with an alkyl or ether carbamate.

Preferably, the primary carbamate material is asymmetrical and/or a mixture of isomers. As a non-limiting example of a mixture of isomers, the primary carbamate material can be a mixture of at least two of 2-hydroxy propyl-1-carbamate, 1-hydroxy propyl-2-carbamate, and 3-hydroxypropyl carbamate.

The material can also be provided as a reaction product of the primary carbamate material and an extending agent to form a prepolymer. The extending agent is any material that is reactive with the at least one functional group that is reactive with an isocyanate in the primary carbamate material and will polymerize in a head to tail arrangement with monomer units. When the functional group is hydroxy, the chain extension agent includes, but is not limited to, lactones and hydroxy carboxylic acids. Preferred lactones are ε-caprolactone and butyl lactone. A preferred carboxylic acid is 12-hydroxydodecanoic acid. The extending agent can also be an oxiran-functional material, such as alkylene oxides. Preferred oxiran functional materials include, but are not limited to, ethylene oxide and propylene oxide. Optionally, the extending agent is asymmetrical. In the prepolymer, there can be any number of extending agents connected to each other per carbamate. In the following ranges, the numbers listed are based on an average of all molecules in a given sample. Preferably there are from 1 to about 20 extending agents connected to each other per carbamate. Preferably, in the prepolymer, there are from 1 to about 6 extending agents connected to each other per primary carbamate material. More preferably, there are 1 to about 3 extending agents connected to each other per primary carbamate material. More preferably, there are about 2 extending agents connected to each other per primary carbamate material. More preferably, there are about 1.5 extending agents connected to each other per primary carbamate material. Even more preferably, there is one extending agent per primary carbamate material. A preferred prepolymer has the structure HAC-(extending agent)$_n$—OH, wherein HAC is hydroxy alkyl carbamate or a group that can be converted to a primary carbamate, and n is a number that is at least 1.

The material can also be a blend of the primary carbamate material with the prepolymer. In a preferred embodiment, the primary carbamate material is about 10% to about 90% of the blend based on the equivalents of carbamate groups. More preferably, the primary carbamate is about 40-90% of the blend based on the equivalents of the carbamate groups. Even more preferably, the primary carbamate material is about 60% to about 90% of the blend based on the equivalents of the carbamate group.

Additionally, a chain extension agent having at least difunctional reactivity with an isocyanate has at least two reactive groups that react with isocyanate groups can be reacted with the other reaction materials. Preferably, there are 2 reactive groups per chain extension agent. Preferably, the reactive groups are hydroxyl, amine, thiol, and combinations thereof. More preferably, the reactive groups are hydroxyl. Optionally, the material can have a pendant alkyl chain. The pendant alkyl chain is the portion of the molecule that is opposite of the terminal reactive group and at a location beyond where the secondary reactive group attaches to the molecule. Also, the chain extension agent may contain heteroatoms, such as O, N, and Si. Optionally, the chain extension agent can be asymmetrical.

The reactive groups of the chain extension agent are placed on the molecular structure such that each reactive group can have the same reactivity or a different reactivity with respect to the other reactive groups. When the groups have different reactivity, at least two of the groups have a different reactivity with respect to the other reactive groups. When there are more than two reactive groups, some of the groups can have the same reactivity with respect to each other and a different reactivity with respect to other groups. When the reactivity is the same, the carbon atoms are all primary, all secondary, all tertiary, or are all substituted to the same degree with the same substituents. When the reactivity is different, the reactive groups are attached to carbon atoms that are not the same with respect to each other. When the reactive groups are amine groups, in addition to the attachment of the amine group to the different carbon atoms, a difference in reactivity can be obtained by changing the substituents on the amine group itself.

Examples of the chain extension agent with at least two functional groups that have different reactivity with respect to each other include, but are not limited to, 2-ethyl-1,3 hexanediol, 2-methyl-2,4-pentane diol, 2,2,4-trimethyl-1,3-pentanediol, 2,4-diethyl-1,5-octanediol, 1-hydroxymethyl cyclohexan-4-ol, 1-amino-hexan-6-ol, 2-ethyl-3-N-methyl-1,3-hexanediamine, isomers of these materials, and mixtures thereof. Examples of the chain extension agent with at least two functional groups that have the same reactivity with respect to each other include, but are not limited to, 1,6-hexane diol and 1,10-decane diol. Examples of the chain extension agent that are asymmetrical are 2-methyl-1,6-hexane diol and 3-methyl-1,10-decane diol.

Preferably, the reaction product has a glass transition temperature, $T_g$, that is less than or equal to about 30° C. One way to provide this $T_g$ is with a low $T_g$ polyisocyanate, which can be determined by reacting the polyisocyanate with methanol to form a product and then measuring the $T_g$ of the product.

Without being limited to theory, it is theorized that the lack of symmetry in the isocyanate, and optionally in the chain extension agent, the primary carbamate material, and/or the extending agent, lowers the crystallinity in the reaction product. This, combined with the low $T_g$ of the reaction product, lowers the amount of organic solvent that is needed to form a coating composition. The lower amount of solvent provides for a lower volatile organic chemical (VOC) content for a coating composition. The VOC that can be obtained by the compositions of the present invention are less than or equal to about 432.4 g/l (3.6 lb./gal.), preferably less than or equal to 192.2 g/l (1.6 lb./gal.), and more preferably less than or equal to 48 g/l (0.4 lb./gal.).

It is also theorized that reaction products that contain symmetry can precipitate out of organic solutions. Additionally, the low $T_g$ of the reaction product provides flexibility to the reaction product. Low $T_g$ of the reaction product can also help lower the VOC and may improve scratch and mar.

In a preferred embodiment, the reaction product is soluble in organic solvents. Examples of organic solvents include, but are not limited to, aliphatic solvents, aromatic solvents, ketone solvents, alcohols, and ester solvents.

In a preferred embodiment, the chain extension agent has two hydroxyl groups that have different reactivity.

A preferred reaction product, when the chain extension agent is not included, can be represented by the following structure: (material)-(asymmetrical, saturated polyisocyanate)-(material). A preferred reaction product, when the chain extension agent is included, can be represented by the following structure: (material)-(asymmetrical, saturated polyisocyanate)-(chain extension agent-asymmetrical, saturated polyisocyanate)$_m$-(material), wherein m is any number that is at least 1 and is based on an average of all reaction products, and material is defined above. In this preferred reaction product, the carbamate groups of the material are the terminal ends of the reaction product.

In a preferred embodiment, the material is provided as a blend of the primary carbamate material and the reaction product of the primary carbamate material with the extending agent. Preferably in this preferred embodiment, the ratio of urethane structures to ester structures in the reaction product is at least 2:1. More preferably, the ratio of urethane structures to ester structures is at least 4:1, with 4:1 being preferred.

In a preferred embodiment, the reaction product has a number average molecular weight of about 464 to about 4000. More preferably, the reaction product has a number average molecular weight of less than about 1500.

The present invention also provides a method for making a reaction product, which comprises reacting a) the asymmetrical, saturated polyisocyanate, the material that is at least one of i) the primary carbamate material having at least one functional group reactive with an isocyanate and at least one primary carbamate group or a group convertible to a primary carbamate group and ii) the reaction product of the primary carbamate material and an extending agent, and c) optionally, the chain extension agent that has at least difunctional reactivity with an isocyanate When the chain extension agent is included in the reaction, the reacting is one of: a) reacting the polyisocyanate, the chain extension agent, and the material together in one reaction, b) reacting the polyisocyanate with the chain extension agent to form a reaction product A, and then reacting reaction product A with the material, and c) reacting the material with the polyisocyanate to form a reaction product B, and then reacting reaction product B with the chain extension agent.

The reaction of the reaction materials can be started with a catalyst. The catalyst can be any catalyst in any amount that facilitates reaction of the reaction materials. Examples of such catalysts include, but are not limited to, stannous octoate, octanoic acid, dibutyltin dilaurate, dibutyl tin oxide, and weak acids.

The reaction can optionally take place in the presence of a solvent. The solvent can be any solvent in any amount that solubilizes the reaction materials. Examples of the solvent include, but are not limited to, organic solvents, polar organic solvents, polar aliphatic solvents, polar aromatic solvents, ketones, esters, acetates, aprotic amides, aprotic sulfoxides, aprotic amines, toluene, xylene, methyl ethyl ketone, methyl isobutyl ketone, m-amyl acetate, ethylene glycol butyl ether acetate, propylene glycol monomethyl ether acetate, n-methylpyrrolidone, blends of aromatic hydrocarbons, and mixtures thereof.

In a preferred reaction, based on the combined weight of the reaction materials, the amount of asymmetrical, saturated polyisocyanate ranges from about 20 to about 60% by weight, and the amount of material having at least one functional group reactive with an isocyanate and at least one primary carbamate group or a group convertible to a primary carbamate group ranges from about 30 to about 70% by weight.

Generally, the reaction temperature for this reaction is controlled from about 0° C. to about 110° C., preferably from about 20° C. to about 90° C. Generally, the amount of initiator ranges from about 0.01 to about 0.1% by weight of the isocyanate. The amount of solvent generally ranges in an amount such that the % non-volatiles ranges from about 10 to about 90%. Generally, the reaction is generally taken to greater than 90% completion as measured by NCO content.

Another non-limiting example of a product of the present invention comprises a molecule of the following structure:

polymer include, but are not limited to, an acrylic, a vinyl, a polyurethane, a polycarbonate, a polyester, an alkyd, and a polysiloxane.

The compositions of the present invention can be included in coating compositions. The coating composition can include, but is not limited to, materials described below. The coating composition can be used as any layer in a coating, which includes, but is not limited to, electrodeposition coating, primer, base coat, top coat, clearcoat, and laminate.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these.

Examples of useful solvents include, but are not limited to, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

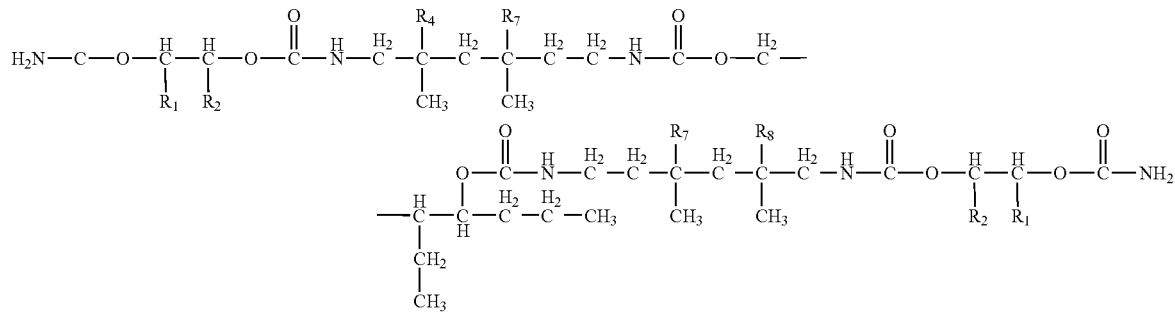

wherein $R_1$, $R_2$, $R_6$, and $R_7$ are defined above.

The composition of the present invention can further include additional polymers. Examples of the additional Coating compositions can be applied on an article/substrate by any of a number of techniques well-known in the art. These include, for example, spray coating, dip coating, roll coating, curtain coating, and the like. For automotive body panels, spray coating is preferred.

Additional agents, for example crosslinkers, surfactants, fillers, stabilizers, wetting agents, dispersing agents, adhesion promoters, UV absorbers, hindered amine light stabilizers, etc. may be incorporated into the coating composition. A preferred crosslinker is an aminoplast. Preferably, the aminoplast is based on melamine or benzoquanamine. Preferred aminoplast resins are melamine formaldehyde resins (including monomeric or polymeric melamine resins and partially or fully alkylated—melamine resins) or urea formaldehyde resins.

While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, a coloring agent can be added to the coating composition. Examples of the coloring agent include, but are not limited to, any organic or inorganic compounds or colored materials, fillers, metallic or other inorganic flake materials such as mica or aluminum flake, and other materials of kind that the art normally includes in such coatings. Coloring agents and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may be any of a number of types well-known in the art. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups.

Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range from 90° C. to 180° C. The first compounds according to the present invention are preferably reactive even at relatively low cure temperatures. Thus, in a preferred embodiment, the cure temperature is preferably from 115° C. to 150° C., and more preferably at temperatures from 115° C. to 140° C. for a blocked acid catalyzed system. For an unblocked acid catalyzed system, the cure temperature is preferably from 80° C. to 100° C. The curing time will vary depending on the particular components used, and physical parameters such as the thickness of the layers, however, typical curing times range from 15 to 60 minutes, and preferably 15-25 minutes for blocked acid catalyzed systems and 10-20 minutes for unblocked acid catalyzed systems.

Compositions of the present invention can provide coatings with improved properties. The flex that can be obtained ranges from about 8 to about 10 as measured by test method General Motors GM9503P. Also, the etch that can be obtained ranges from about 2 to about 8 as measured by test method General Motors World Specification GM W-3005 paragraph 5.15, and more preferably ranges from about 2 to about 6.

SPECIFIC EMBODIMENTS OF THE INVENTION

The invention is further described in the following examples. The examples are merely illustrative and do not in any way limit the scope of the invention as described and claimed. All parts are parts by weight unless otherwise noted.

EXAMPLE 1

A reactor equipped with an agitator, a thermocouple, and a nitrogen gas inlet was charged with 340.1 g of hydroxypropyl carbamate, 86.2 g of propylene glycol monomethyl ether acetate, and 0.35 g of dibutyltin dilaurate and heated to 60° C. Stepwise in ⅛ amounts, 307.6 g of trimethylhexamethylene diisocyanate was added and allowed to react. Finally, 13.3 g of isobutanol and 200.7 g of propylene glycol monomethyl ether acetate were added.

EXAMPLE 2

A reactor equipped with an agitator, a thermocouple, and a nitrogen gas inlet was charged with 194.6 g of hydroxypropyl carbamate, 118.1 g 2-ethyl-1,3-hexane diol, 65.6 g of propylene glycol monomethyl ether acetate, and 0.34 g of dibutyltin dilaurate and heated to 60° C. Stepwise in ⅛ amounts, 350.3 g of trimethylhexamethylene diisocyanate was added and allowed to react. Finally, 13.1 g of isobutanol and 268.8 g of propylene glycol monomethyl ether acetate were added. The composition had a non-volatile content of 66.5 with a viscosity of 76.5 poise as measured on a BROOKFIELD™ cone and plate viscometer at 25° C. This composition had higher non-volatiles and was able to stay in solution as compared to Comparative Example 4.

COMPARATIVE EXAMPLE 3

A reactor equipped with an agitator, a thermocouple, and a nitrogen gas inlet was charged with 839.4 g of hydroxypropyl carbamate, 889.2 g of propylene glycol monomethyl ether acetate, 514.6 g of 2-ethyl-1,3-hexane diol, and 1.25 g of dibutyltin dilaurate and heated to 60° C. Stepwise, 150 ml of 1,6-diisocyanto hexane, 125 ml of 1,6-diisocyanto hexane, and the balance of 1244.4 g of 1,6-diisocyanto hexane were added. Next, 197 g of propylene glycol monomethyl ether acetate, 53.9 g of isobutanol, and 342.7 g of isopropanol were added. The composition had a non-volatile content of 64.4%. The composition was crystalline and would not stay in solution. Even with the addition of additional solvent, the reaction product would not stay in solution.

COMPARATIVE EXAMPLE 4

A reactor equipped with an agitator, a thermocouple, and a nitrogen gas inlet was charged with 49.4 parts of methyl ethyl ketone and was heated to reflux under an inert atmosphere to remove any water. The reactor was cooled to 50° C., and 21 parts of hexane diisocyanate and 0.0004 parts of dibutyl tin dilaurate were added. The reaction mixture was cooled to 40° C., and 28.2 parts of hydroxypropyl carbamate were slowly added. During this addition, the reaction mixture was allowed to exotherm to 75° C. The reaction was held at 75° C. Forty-five minutes into the hold, the product precipitated out of solution, forming a solid mass.

EXAMPLE 5

A reactor equipped with an agitator, a thermocouple, and a nitrogen gas inlet was charged with 49.4 parts water free methyl ethyl ketone. Next, 23.7 parts of trimethylhexanediisocyanate (a mixture of 2,2,4-trimethylhexanediisocyante and 2,4,4-trimethylhexanediisocyanate) and 0.0004 parts of dibutyl tin dilaurate were added to the reactor at 49° C. The reaction mixture was cooled to 39° C., and 25.5 parts of hydroxypropyl carbamate were added. During the addition, the reaction temperature increased to 73° C. Once the add was complete, the reaction was heated to 75° C. and held. No precipitate formed after 2 hours and 25 minutes at 75° C. After this time, 1.3 parts of isobutyl alcohol were added to remove any unreacted isocyanate, and the mixture was allowed to cool down. The reaction mixture was still in solution the next day.

It should be appreciated that the present invention is not limited to the specific embodiments described above, but includes variations, modifications and equivalent embodiments defined by the following claims.

What is claimed is:

1. A coating prepared from a coating composition comprising a reaction product of
   a. 1,8-diisocyanato-4-(isocyanatomethyl)octane,
   b. a material that is at least one of
      i. a primary carbamate material having at least one functional group reactive with an isocyanate and
      ii. a reaction product of the primary carbamate material and an extending agent,
   wherein the primary carbamate material is represented by the following structure:

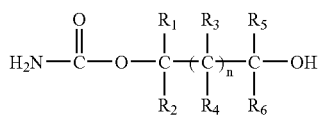

wherein $R_1$, $R_2$, $R_3$, $R_4$, $R_5$, and $R_6$ are each independently H or $C_1$-$C_6$ alkyl, and n is 0 or a positive integer, and c. optionally, a chain extension agent that has at least difunctional reactivity with an isocyanate.

2. The coating of claim 1, wherein the coating has flex of from about 8 to about 10 as measured by General Motors GM9503P.

3. The coating of claim 1, wherein the coating has an etch of from about 2 to about 8 as measured by General Motors World Specification GM W-3005 paragraph 5.15.

4. The coating of claim 1, wherein the functional group reactive with an isocyanate on the primary carbamate material is at least one of a hydroxyl group, an amine group, and a thiol group.

5. The coating of claim 1, wherein the primary carbamate material is represented by the following structure:

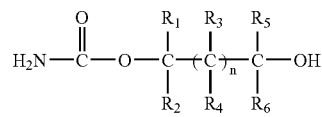

wherein $R_1$, $R_2$, $R_3$, $R_4$, $R_5$, and $R_6$ are each independently H or $C_1$-$C_6$ alkyl, and n is a positive integer.

6. The coating of claim 1, wherein the primary carbamate material is at least one of hydroxy ethyl carbamate, hydroxy propyl carbamate, and/or hydroxy butyl carbamate.

7. The coating of claim 1, wherein the extending agent is at least one of a lactone and a hydroxy carboxylic acid.

8. The coating of claim 1, wherein the extending agent is ∈-caprolactone.

9. The coating of claim 1, wherein the material is a blend of the primary carbamate material and the reaction product of the primary carbamate material and the extending agent.

10. The coating of claim 9, wherein in the blend, the primary carbamate material is present in an amount from about 10% to about 90% based on the equivalents of carbamate groups.

11. The coating of claim 1, wherein in the reaction product of the primary carbamate material and the extending agent, there are from 1 to about 20 extending agents connected to each other per primary carbamate material based on an average of all reaction product molecules.

12. The coating of claim 1, wherein in the reaction product of the primary carbamate material and the extending agent, there are from 1 to about 3 extending agents connected to each other per primary carbamate material based on an average of all reaction product molecules.

13. The coating of claim 1, wherein in the reaction product of the primary carbamate material and the extending agent, there is 1 extending agent per primary carbamate material.

14. The coating of claim 1, wherein the chain extension agent has two functional groups reactive with an isocyanate.

15. The coating of claim 1, wherein the functional group reactive with an isocyanate on the chain extension agent is at least one of hydroxyl, amine, and thiol.

16. The coating of claim 1, wherein the chain extension agent has two hydroxyl groups.

17. The coating of claim 1, wherein the chain extension agent contains a heteroatom.

18. The coating of claim 1, wherein the chain extension agent is selected from the group consisting of 2-ethyl-1,3 hexanediol; 2-methyl-2,4-pentane dial; 2,2,4-trimethyl-1,3-pentanediol; 2,4-diethyl-1,5-octanediol; 1-hydroxymethyl cyclohexan-4-ol; 1-amino-hexan-6-ol; 2-ethyl-3N-methyl-1,3-hexane diamine; isomers of the preceding materials; 1,6-hexane diol; 1,10-decane diol; 2-methyl-1,6-hexane diol; 3-methyl-1, 10-decane diol, and mixtures thereof.

19. The coating of claim 1, wherein the chain extension agent is asymmetrical.

20. The coating of claim 1, wherein the primary carbamate material is asymmetrical.

21. The coating of claim 1, wherein the extending agent is asymmetrical.

22. The coating of claim 1, wherein the primary carbamate material, the extending agent, and the chain extension agent are each asymmetrical.

23. The coating of claim 1, wherein the primary carbamate material is a mixture of isomers.

24. The coating of claim 1, wherein the primary carbamate material is a mixture of isomers and is asymmetrical.

25. The coating of claim 1, wherein the reaction product is soluble in at least one of an aliphatic solvent, aromatic solvent, a ketone solvent, an alcohol, and an ester solvent.

26. The coating of claim 1, wherein the reaction product has a $T_g$ of less than or equal to about 30° C.

27. The coating of claim 1, wherein a ratio of urethane structures to ester structures in the reaction product is at least 2:1.

28. The coating of claim 1, wherein a ratio of urethane structures to ester structures in the reaction product is 4:1.

* * * * *